(12) United States Patent
Reich et al.

(10) Patent No.: US 9,335,067 B2
(45) Date of Patent: May 10, 2016

(54) SOLAR REFLECTOR ASSEMBLY

(75) Inventors: Alan Reich, Farmington, MI (US); Gianfranco Gabbianelli, Birmingham, MI (US)

(73) Assignee: Magna International Inc., Aurora, Ontario (CA)

( * ) Notice: Subject to any disclaimer, the term of this patent is extended or adjusted under 35 U.S.C. 154(b) by 869 days.

(21) Appl. No.: 13/522,330

(22) PCT Filed: Jan. 14, 2011

(86) PCT No.: PCT/CA2011/000056
§ 371 (c)(1),
(2), (4) Date: Jul. 17, 2012

(87) PCT Pub. No.: WO2011/085492
PCT Pub. Date: Jul. 21, 2011

(65) Prior Publication Data
US 2012/0327526 A1 Dec. 27, 2012

Related U.S. Application Data

(60) Provisional application No. 61/295,224, filed on Jan. 15, 2010.

(51) Int. Cl.
| G02B 7/182 | (2006.01) |
|---|---|
| G02B 7/183 | (2006.01) |
| B23P 11/00 | (2006.01) |
| F24J 2/12 | (2006.01) |
| F24J 2/10 | (2006.01) |

(52) U.S. Cl.
CPC .. *F24J 2/12* (2013.01); *B23P 11/00* (2013.01); *G02B 7/182* (2013.01); *F24J 2002/1085* (2013.01); *G02B 7/183* (2013.01); *Y02E 10/42* (2013.01); *Y10T 29/49885* (2015.01); *Y10T 29/49904* (2015.01); *Y10T 29/49947* (2015.01)

(58) Field of Classification Search
CPC .......... G02B 5/10; G02B 7/182; G02B 7/183; Y02E 10/42; B23P 11/00; F24J 2/12
USPC .......... 359/850, 851, 853, 871, 900; 126/684, 126/696; 343/912, 915; 29/469, 458, 29/525.01
See application file for complete search history.

(56) References Cited

U.S. PATENT DOCUMENTS 2,806,134 A * 9/1957 Tarcici ............................ 359/853
3,235,872 A * 2/1966 Schepis ......................... 343/912

(Continued)

FOREIGN PATENT DOCUMENTS

| CN | 2106331 U | 6/1992 |
|---|---|---|
| EP | 0022887 A1 | 1/1981 |
| GB | 2341675 A | 3/2000 |

*Primary Examiner* — Ricky D Shafer
(74) *Attorney, Agent, or Firm* — Dickinson Wright PLLC

(57) ABSTRACT

A gore assembly is provided which is made from at least two metal panels. The metal panels comprise downturned flanges along opposing radial edges. The flanges point away from an A-surface of the gore assembly and face a B-surface. The panels are fastened to each other along the flanges on the radial edges. In addition, the gore assembly includes further metal reinforcement members fastened to the B-surface of the gore assembly to provide additional structural support to the gore assembly. Moreover, local attachment brackets can be fastened to the panel reinforcement members for further structural support and for mounting the gore assembly to a chassis.

40 Claims, 14 Drawing Sheets

(56) References Cited

U.S. PATENT DOCUMENTS

| | | | | |
|---|---|---|---|---|
| 3,797,476 A | * | 3/1974 | Tarcici | 126/600 |
| 4,372,027 A | * | 2/1983 | Hutchison | 29/448 |
| 4,422,614 A | * | 12/1983 | Santos | 248/475.1 |
| 4,423,926 A | * | 1/1984 | Stolpin | 359/853 |
| 4,458,251 A | * | 7/1984 | Bondon | 343/914 |
| 4,506,271 A | * | 3/1985 | Gonzalez | 343/915 |
| 4,893,132 A | * | 1/1990 | Habibi | 343/912 |
| 5,421,376 A | * | 6/1995 | Sinha | 139/419 |
| 7,859,479 B2 | * | 12/2010 | Legare et al. | 343/882 |

* cited by examiner

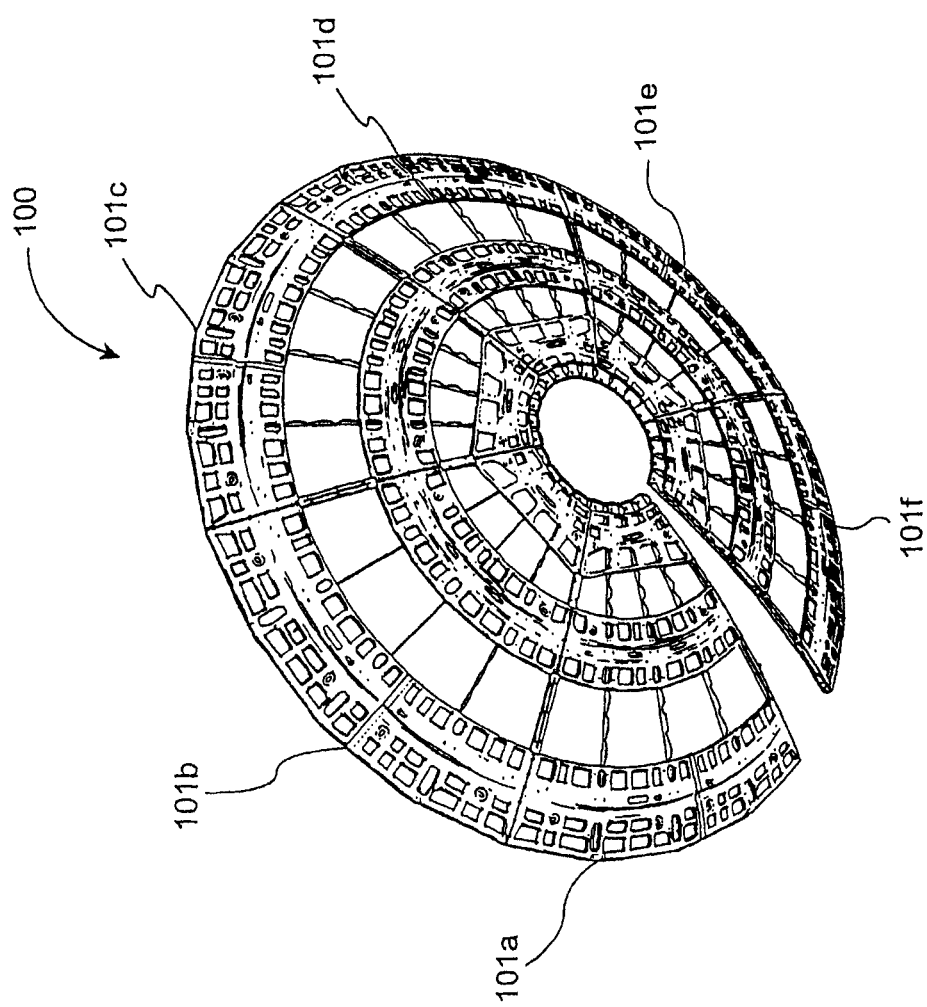

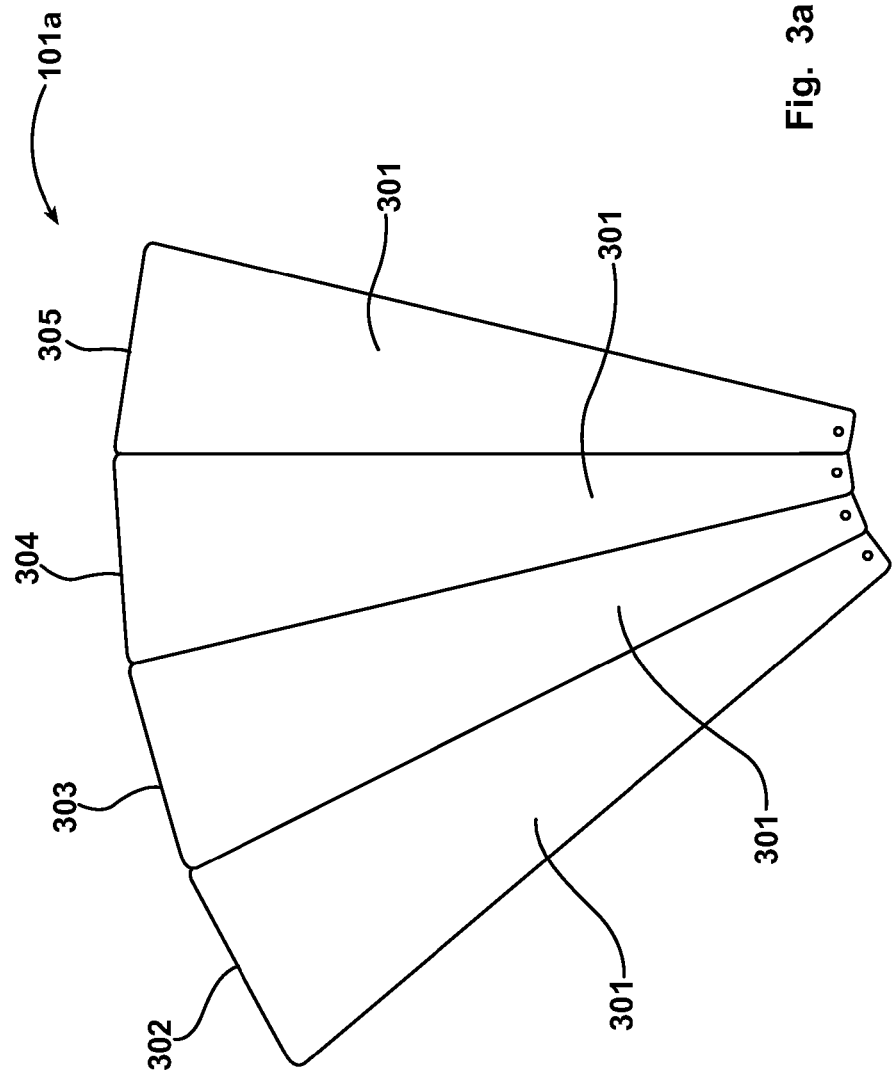

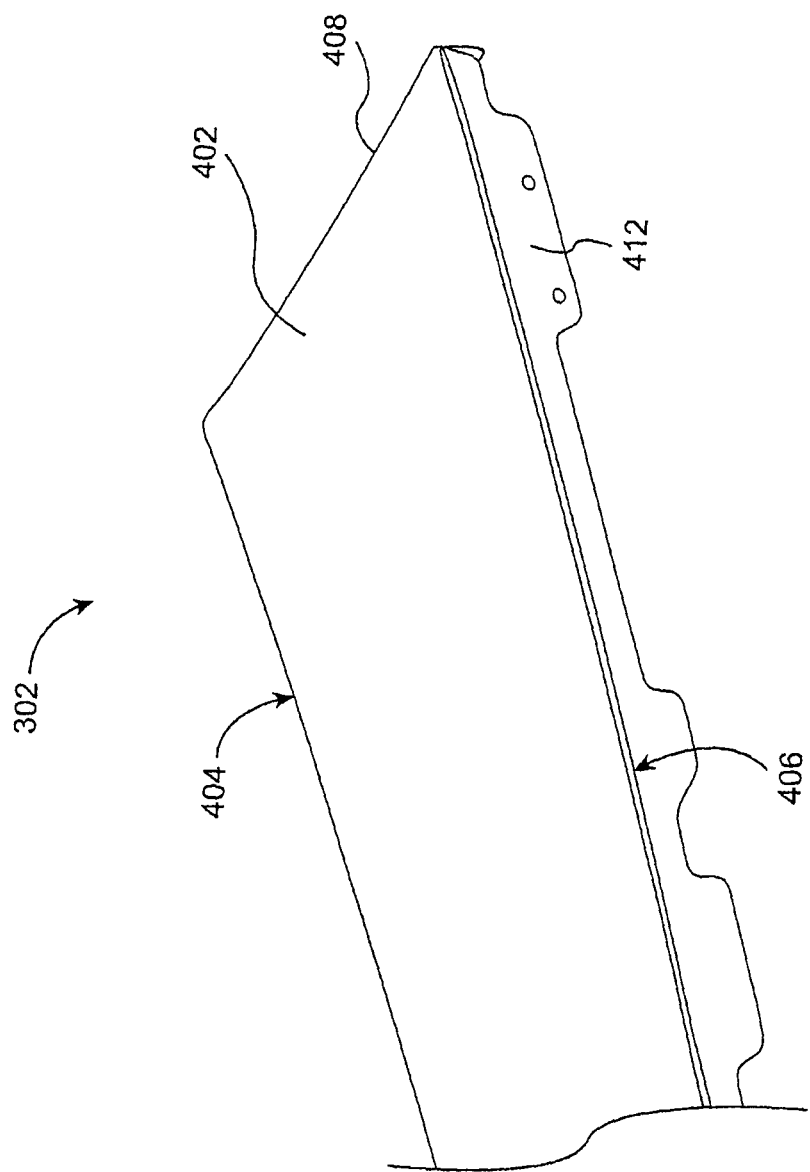

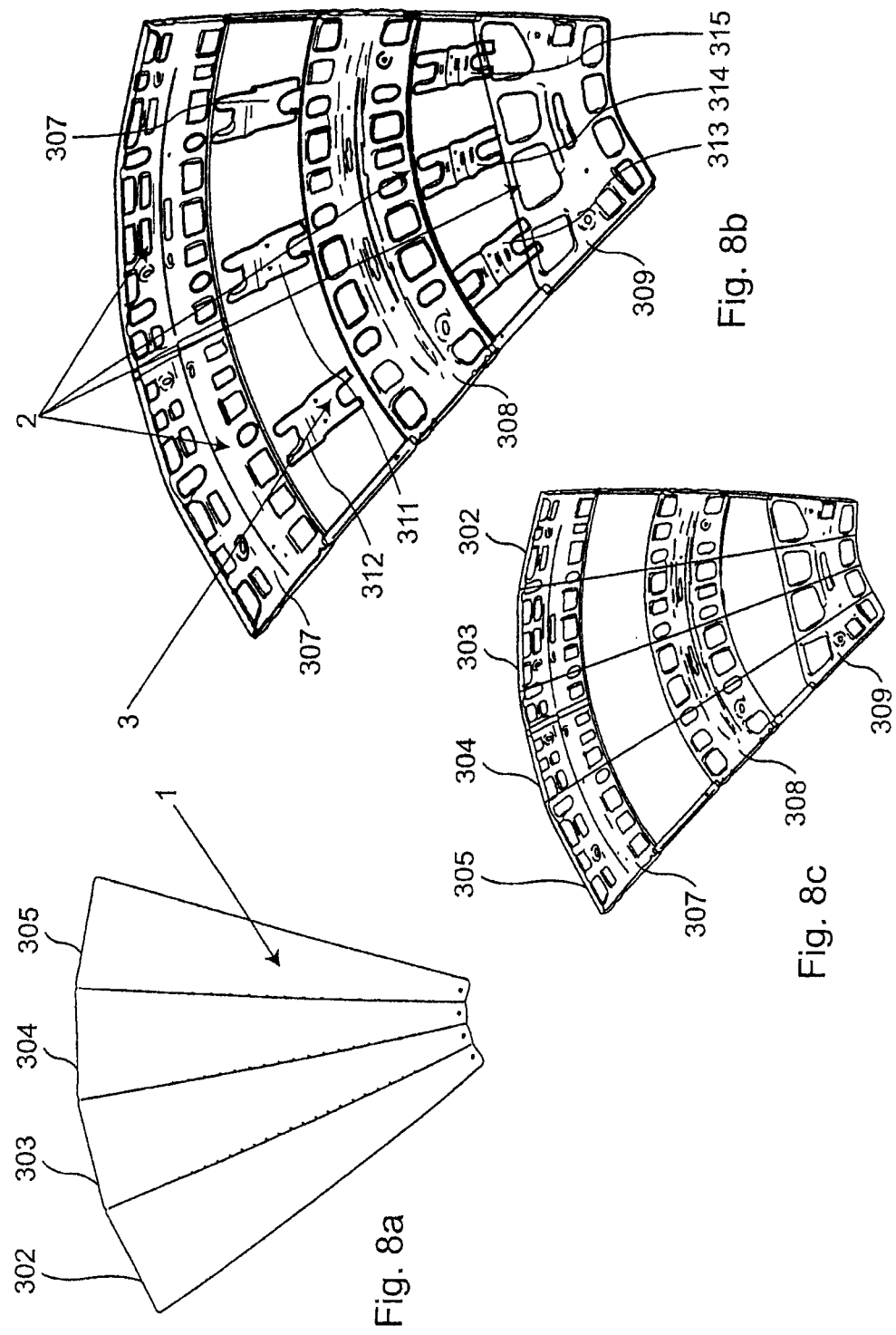

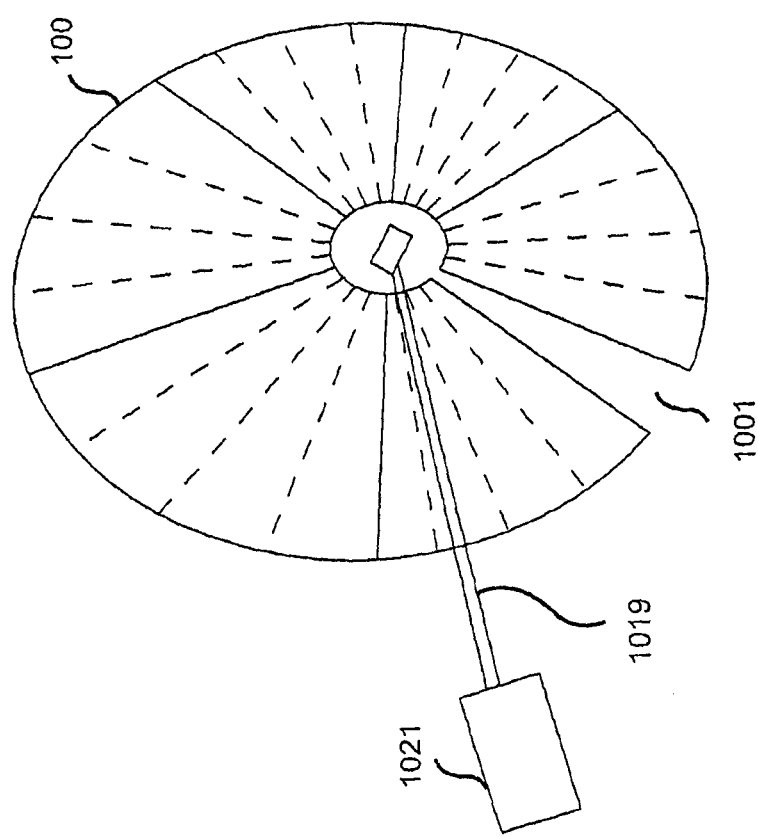

SOLAR REFLECTOR ASSEMBLY

CROSS REFERENCE TO RELATED APPLICATIONS

This U.S. National Stage patent application claims priority to International Patent Application Serial No. PCT/CA2011/000056 filed on Jan. 14, 2011, entitled "Solar Reflector Assembly" and U.S. Provisional Patent Application No. 61/295,224 filed on Jan. 15, 2010, the entire disclosures of all of these applications being considered part of the disclosure of this application and are hereby incorporated by reference.

FIELD OF THE INVENTION

The instant invention relates generally to the field of solar reflector assemblies, and more particularly to a metal gore assembly and its manufacture.

BACKGROUND OF THE INVENTION

Concentrating Solar Power (CSP) systems utilize mirrors or other types of reflective members to concentrate the sun's energy onto points or lines. A typical CSP system uses a parabolic dish for supporting the minors. More specifically, the minors are aligned and mounted on a strongback so as to provide an optical surface that is configured for concentrating incident solar rays onto an energy convertor, such as for instance a heat engine. In order to permit the mirrors to receive maximum energy from the sun the parabolic dish-shaped array may be mounted to a structural pylori, and coupled with a drive unit and controller assembly for tracking the movement of the sun across the sky.

Several problems are known to be associated with prior art CSP systems that are based on parabolic dish-shaped arrays. In particular, the array that is used for concentrating the sun's energy is made from gore assemblies having parabolic reflector elements secured to an A-surface thereof. Each gore assembly must have a precisely defined shape across its entire A-surface, which may have a relatively large surface area. Providing a precise shape over relatively large surface areas is challenging from a manufacturing standpoint. Further, when the gore assemblies are assembled together to form the dish-shaped array, the resulting structure must be sufficiently rigid to be able to support the weight of the array and substantially prevent deformation of the optical surface, even under conditions of extreme wind and snow loading.

It would be desirable to provide a gore assembly and a method of making such a gore assembly, which overcomes at least some of the above-mentioned limitations of the prior art.

SUMMARY OF EMBODIMENTS OF THE INVENTION

In accordance with an aspect of the instant invention, a gore assembly made from metal is provided. The gore is assembled from at least two individual metal panels. The individual panels are manufactured by a stamping operation, for example. During the manufacturing process, each individual panel is provided with a curvature so as to reflect the solar beams captured by reflective members provided on an A-surface of the panel onto a focal point that is specific to a solar beam collector. In accordance with a further aspect of the invention, the B-surface of the panel is provided with additional reinforcement members to provide sufficient structural support and rigidity to the gore assembly in accordance with the invention.

In accordance with an aspect of an embodiment of the instant invention, there is provided a gore assembly for focusing solar energy, comprising: at least two panels, each panel having two radial edges and having a first surface defined between said two radial edges for receiving a plurality of reflective elements thereon, each panel having a second surface that is opposite the first surface and that is defined between said two radial edges, and each panel having a flange provided along at least a portion of each of said two radial edges, wherein, in an assembled condition, one of said two radial edges of one of the at least two panels is abutted with one of said two radial edges of the other one of the at least two panels, and wherein, in the assembled condition, the flange along the one of said two radial edges of the one of the at least two panels is aligned with the flange along the one of said two radial edges of the other one of the at least two panels, the at least two panels fixedly secured one to the other via the aligned flanges along the abutted radial edges thereof.

In accordance with an aspect of an embodiment of the instant invention, there is provided a method of making a gore assembly, comprising: stamping sheet metal so as to form at least two panels, each of the at least two panels having a first surface on a first side thereof for receiving a plurality of reflective members thereon, and having a second surface on a second side thereof that is opposite the first side, each of said at least two panels comprising opposing radial edges, each opposing radial edge having a flange defined along at least a portion thereof; stamping sheet metal for forming a panel-reinforcement member; aligning the flange along one radial edge of one of the at least two panels with the flange along one radial edge of the other of the at least two panels; fastening the at least two panels one to the other along the aligned flanges of the radial edges; and fastening the panel-reinforcement member to the second surfaces of the at least two panels, such that the panel-reinforcement member spans the at least two panels, for providing reinforcement to the gore assembly.

In accordance with an aspect of an embodiment of the instant invention, there is provided a gore assembly for focusing solar energy, comprising: N panels, N>1, each panel having two radial edges and having a first surface defined between said two radial edges, the first surface for receiving a plurality of reflective elements thereon, each panel having a second surface on a side thereof that is opposite the first surface, and each panel having a flange defined along at least a portion of each of said two radial edges, the N panels disposed in an edge-to-edge arrangement such that N−1 pairs of abutted radial edges are defined, and such that the flange along one radial edge of each pair of abutted radial edges is aligned with the flange along the other radial edge of the pair of abutted radial edges; and, a panel-reinforcement member disposed in a mating relationship with the second surfaces of the N panels, the panel-reinforcement member spanning the N panels and comprising a plurality of flanges extending away from the panel-reinforcement member and in a direction toward the second surfaces of the N panels, the plurality of flanges arranged for being aligned with the flanges of the N panels, wherein, in an assembled condition, some flanges of the panel-reinforcement member are aligned with and mechanically coupled to the aligned flanges along the pairs of abutted radial edges of the N panels, and other flanges of the panel-reinforcement member are aligned with and mechanically coupled to the flanges along outer, non-abutted radial edges of the edge-to-edge arrangement of N panels.

BRIEF DESCRIPTION OF THE DRAWINGS

Exemplary embodiments of the instant invention will now be described in conjunction with the following drawings, wherein like numerals represent like elements, and in which:

FIG. 2 shows the B-surface of the solar array presented in FIG. 1;

FIG. 3a shows a more detailed view of the A-surface of one of the gore assemblies of the solar array presented in FIGS. 1 and 2;

FIG. 4a shows a more detailed view of the A-surface of one of the panels of the gore assembly presented in FIGS. 3a and 3b;

FIG. 8a shows the A-surface of a side-by-side arrangement of individual panels;

FIG. 8b shows the arrangement of the individual reinforcement members one relative to another;

FIG. 8c shows the reinforcement members of FIG. 8b secured to the A-surface of the side-by-side arrangement of individual panels of FIG. 8a;

FIG. 11 shows the solar array of FIG. 1 mounted to the chassis structure shown in FIG. 10.

DETAILED DESCRIPTION OF THE DRAWINGS

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
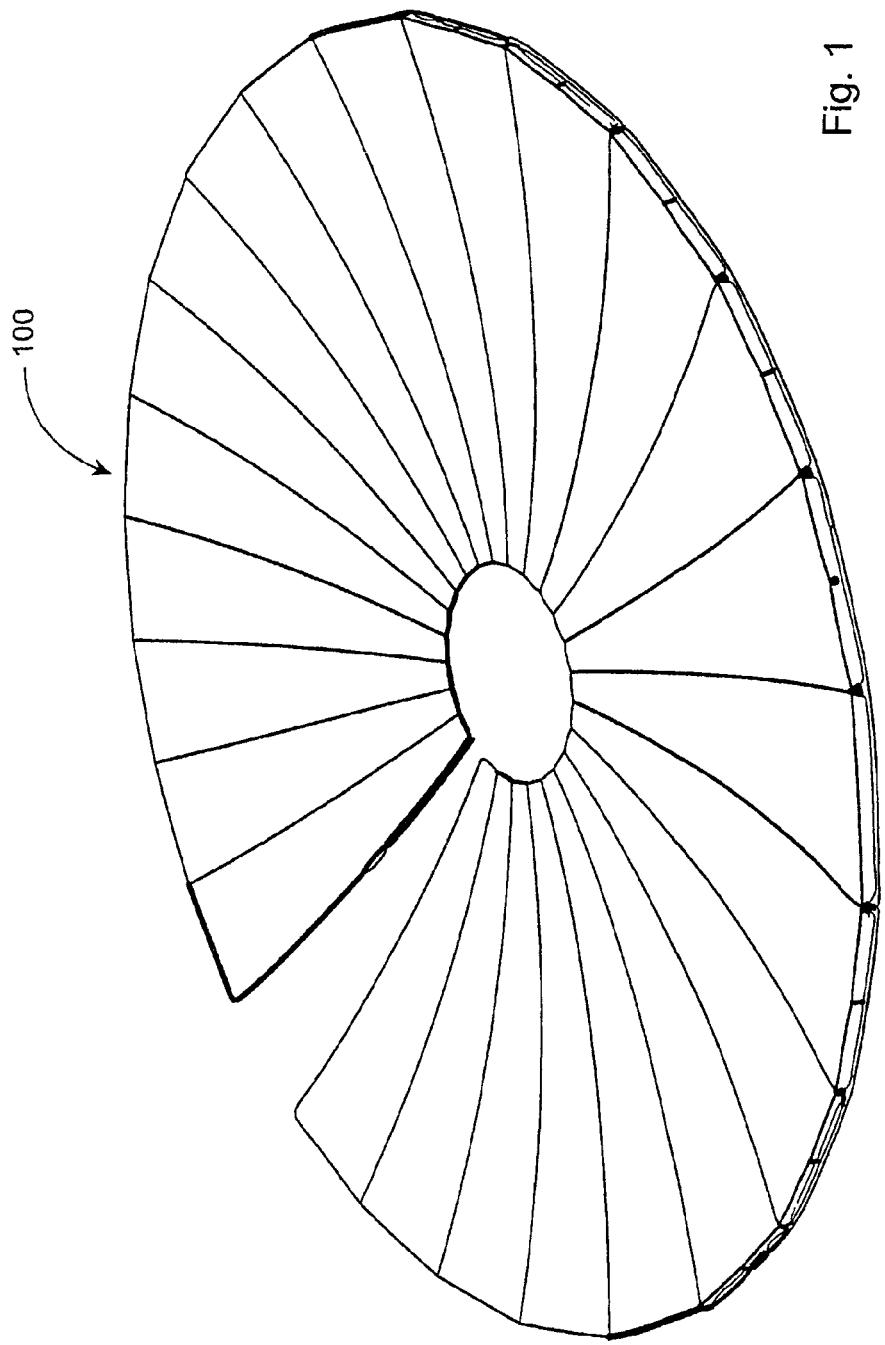
FIG. 1 shows the reflective surface of a solar array.

FIG. 1 presents a view of the A-surface of a solar array 100, in accordance with an embodiment of the instant invention. FIG. 2 presents a view of the B-surface of the solar array 100. The A-surface and B-surface are alternatively referred to as a first surface and a second surface, respectively. As is shown most clearly in FIG. 2, the solar array 100 comprises a plurality of individual gore assemblies 101a-101f. In the specific and non-limiting example that is depicted in FIGS. 1 and 2, the solar array 100 includes six gore assemblies. Optionally, a number of gore assemblies greater than or less than six is provided.

Figure 3B:
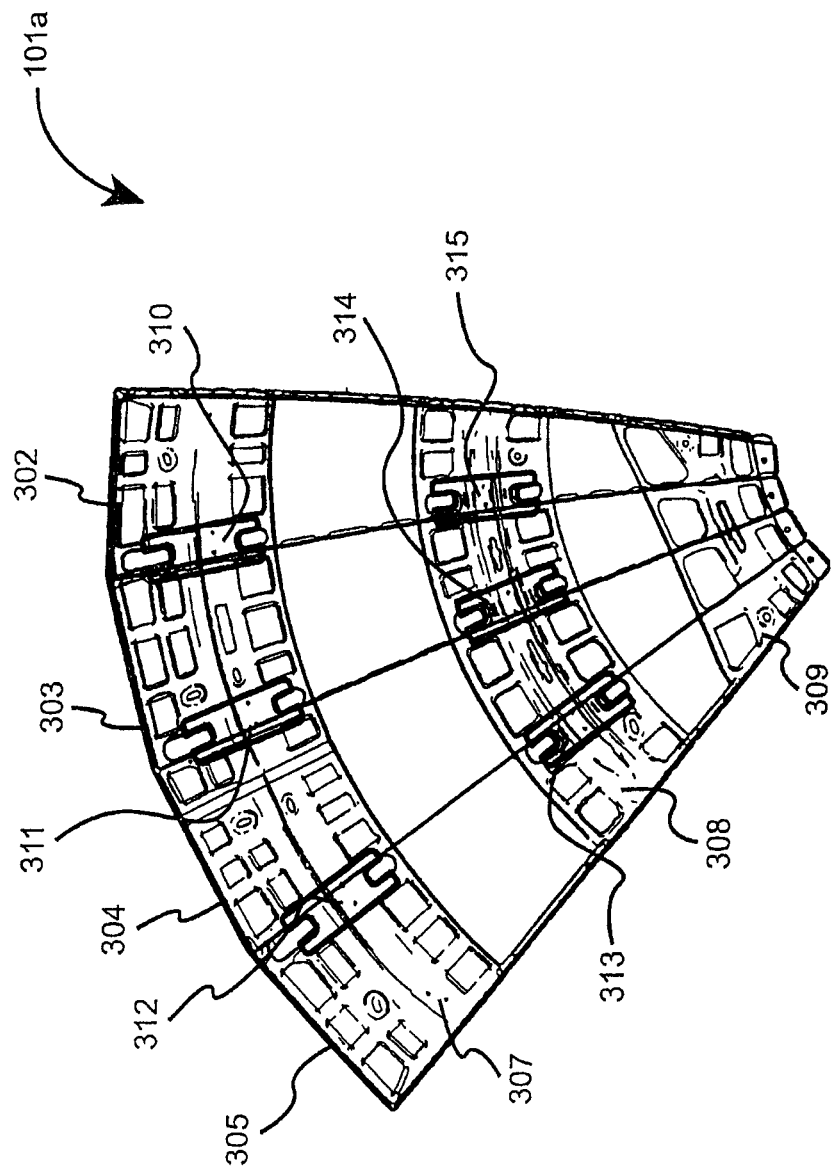
FIG. 3b shows a more detailed view of the B-surface of one of the gore assemblies of the solar array presented in FIGS. 1 and 2.

FIGS. 3a and 3b present detailed views of a gore assembly according to an embodiment of the instant invention. It is to be understood that although the gore assembly 101a is shown explicitly in FIGS. 3a and 3b, the other gore assemblies 101b-f also have substantially the same arrangement. Referring now to FIG. 3a, the A-surface of the gore assembly 101a is shown, to which surface reflective members 301 such as for instance mirrors, polished aluminum or other metals are bonded. The reflective members are bonded to the A-surface using adhesives, such as for instance pressure sensitive tapes or pressure sensitive adhesives. In the specific and non-limiting example that is depicted in FIG. 3a, the gore assembly 101a includes four individual panels 302-305. The individual panels 302-305 are made from metal, such as for instance steel, and are manufactured by a stamping operation. Optionally, fewer or more panels are utilized to manufacture the gore assembly according to an embodiment of the instant invention.

Figure 4B:
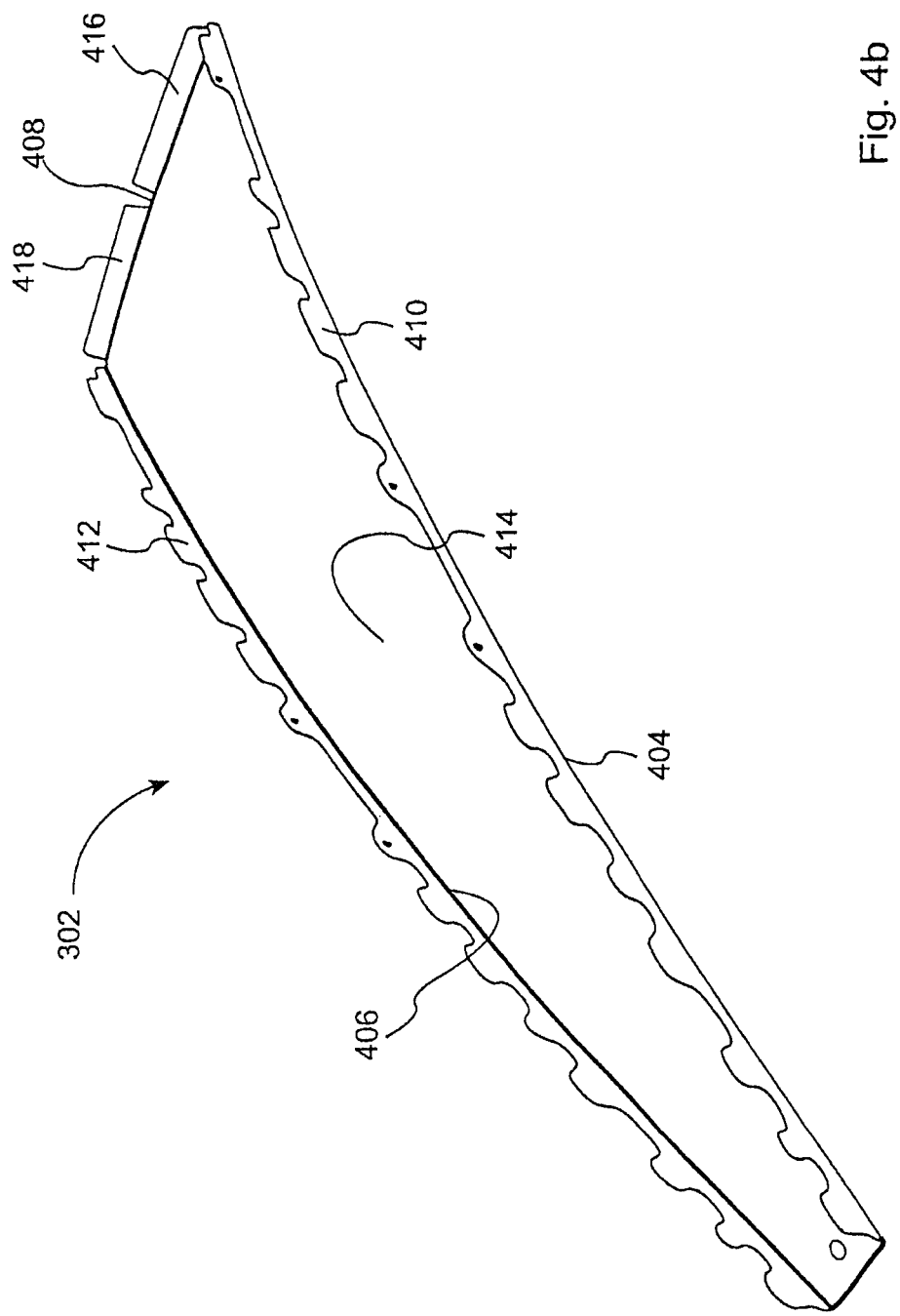
FIG. 4b shows a more detailed view of the B-surface of one of the panels of the gore assembly presented in FIGS. 3a and 3b.

Referring now to FIGS. 4a and 4b, shown are more detailed views of the panel 302 of the gore assembly 101a, which is intended to serve as a representative example of panels 302-305. FIG. 4a shows the A-surface 402 of panel 302, two radial edges 404 and 406, and circumferential edge 408, and FIG. 4b shows the B-surface 414 of panel 302. The A-surface of panel 302 faces in a first direction, and the B-surface of panel 302 faces in a second direction that is substantially opposite the first direction. As is shown in FIGS. 4a and 4b, a flange 410 is formed along radial edge 404, a flange 412 is formed along radial edge 406, and flanges 416 and 418 are formed along circumferential edge 408. Each one of the flanges 410, 412, 416 and 418 protrudes in the second direction, away from the A-surface and B-surface. In the specific and non-limiting example that is shown in FIGS. 4a and 4b, the flanges 410, 412, 416 and 418 are substantially normal to the B-surface. Flanges 410 and 412 extend along substantially the entire length of radial edges 404 and 406, respectively. Each of the flanges 410 and 412 is shown as a single flange with notch features disposed at various locations along the length of the respective radial edges 404 and 406. The radial edges 404 and 406 and the flanges 410 and 412 provided thereon are used to secure the individual panels 302-305 together. This can be done, for example, by aligning the flange 410 along the radial edge of one of the panels with the flange 412 along the radial edge 406 of an adjacent panel, and then spot welding along the aligned flanges. The notch features of the flanges 410 and 412 are configured for receiving panel reinforcement members, as will be described in greater detail in the following sections. Optionally, each of the flanges 410 and 412 is provided as a plurality of separate flanges, such as for instance would be the case when the notch features extend all the way to the radial edges 404 and 406 respectively. That being said, providing a continuous flange with relatively shallow notch features along substantially the entire length of the radial edges 404 and 406 results in stiffer panels for use in the gore assemblies 101a-f. Flanges 416 and 418 along circumferential edge 408 are shown as two separate flanges in FIG. 4b, but of course optionally they are formed as a single flange with a central notch defining a relatively narrowed feature of the single flange. Forming the flanges 416 and 418 as a single flange with a notch feature also results in stiffer panels for use in the gore assemblies 101a-f.

Referring again to FIG. 3b, it can be seen that further panel reinforcement members 307-309 are provided adjacent to the B-surfaces of the panels 302-305 of the gore assembly 101a.

The panel-reinforcement members 307-309 are also stamped metal parts, such as stamped steel parts. The panel-reinforcement members 307-309 interface, i.e., they are slidingly received onto the flanges of the radial edges of panels 302-305, and are spot welded to said flanges so as to provide a gore assembly of sufficient rigidity and stiffness to withstand forces acting upon the assembly. For example, each panel 302-305 is stamped with a particular curvature so that the reflective members 301 mounted on the A-surface channel captured solar light onto a focal point of a solar concentrator. Thus, a certain rigidity and stiffness of the gore assembly is needed to maintain the predetermined shape or curvature of the panels in the gore assembly, so as to achieve a good reflection of the solar light onto the focal point of the solar collector, as depicted in FIG. 11. Prior to mounting the panel reinforcement members 307-309 to panels 302-305, additional local attachment brackets 310-315 optionally are mounted onto the panel reinforcement members 307-309, in places where additional reinforcement is desired. These additional local attachment brackets 310-315 are also stamped metal parts, and are spot-welded to the reinforcement members 305-307. In accordance with the embodiment described herein, spot welding is provided as one method of mounting and fixedly securing the various reinforcement members. Alternatively, mechanical fasteners or adhesives can be utilized to mount and fixedly secure the various reinforcement members and panels of the gore assembly.

Figure 5:
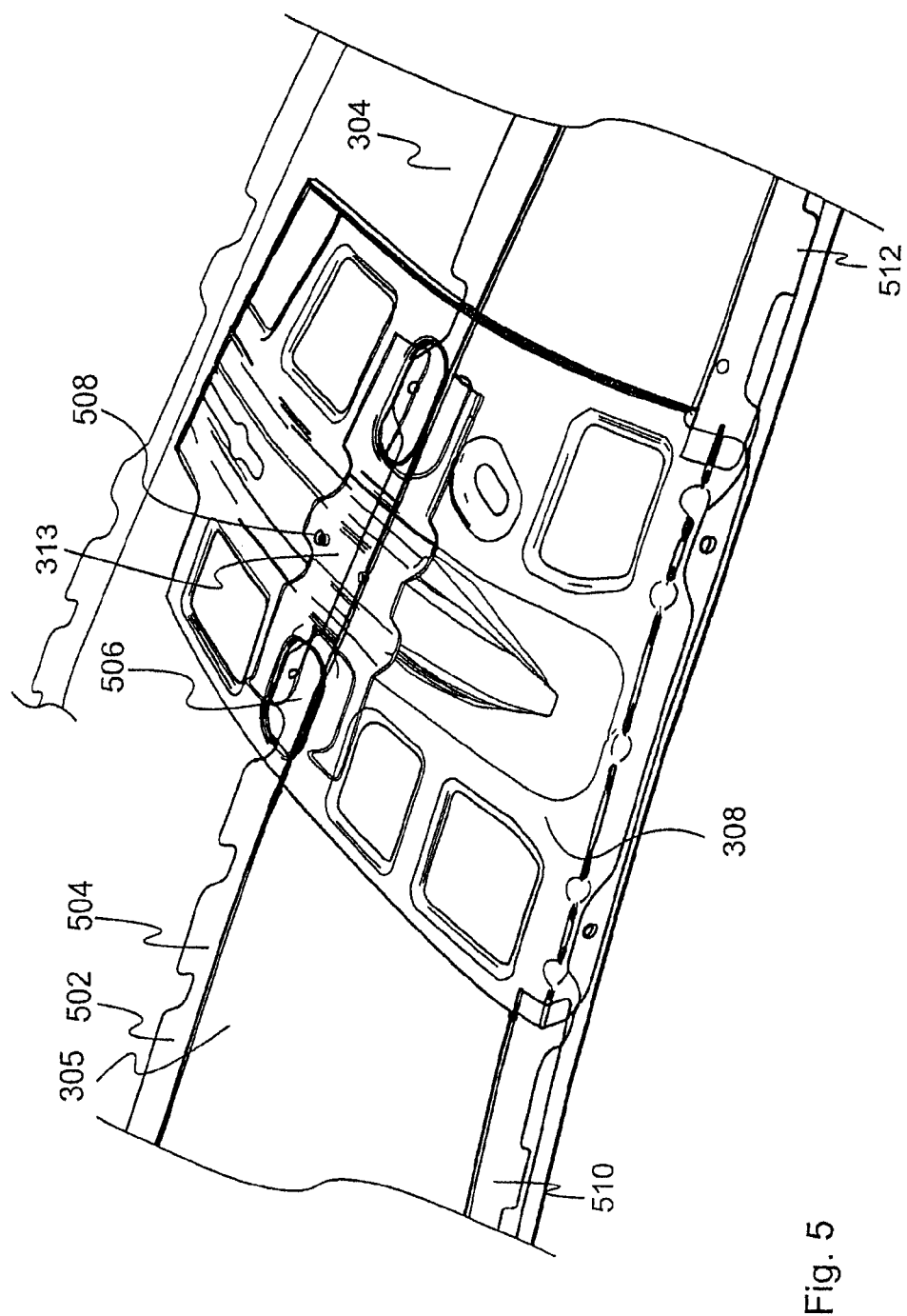
FIG. 5 shows an enlarged, detailed view of the various reinforcement members depicted in FIG. 3b.

FIG. 5 shows a more detailed view of the various reinforcement members depicted in FIG. 3b. For example, radial edges of the panels 304 and 305 are mated with each other and are mechanically coupled, such as e.g., spot-welded, in locations where the flanges are mutually aligned, as indicated by exemplary reference numerals 502 and 504. Furthermore, locations where multiple reinforcement members are aligned can also be mechanically coupled, such as e.g., spot-welded, to provide sufficient support to the assembled gore structure. For example, reference numeral 506 depicts a location where the flanges along the radial edges of the panels 304 and 305 meet with the panel reinforcement member 308 and with the local attachment bracket 313. Reference numeral 508 indicates a mounting location for the panel arms of the chassis structure to the gore assembly. This can be achieved by means of a weld nut to bolt it to the panel arms shown in FIG. 10. However, other threaded or alternative fasteners can be used instead for fastening the gore assembly to the panel arm of the chassis.

Referring still to FIG. 5, shown are two C-channel brackets 510 and 512 which are slipped onto the outer radial edges of the gore assembly, i.e., more precisely the outer radial edges of panels 302 and 305. The C-channel brackets 510 and 512 add further structural support and stiffness to the gore assembly. These brackets are provided only on the outer edges of the gore assembly, and provide for a safe handling of the gore assembly as sharp outer edges are covered. Furthermore brackets 510 and 512 also bridge the gaps along the outer edges between the panel reinforcement members 307, 308, and 309.

Figure 6:
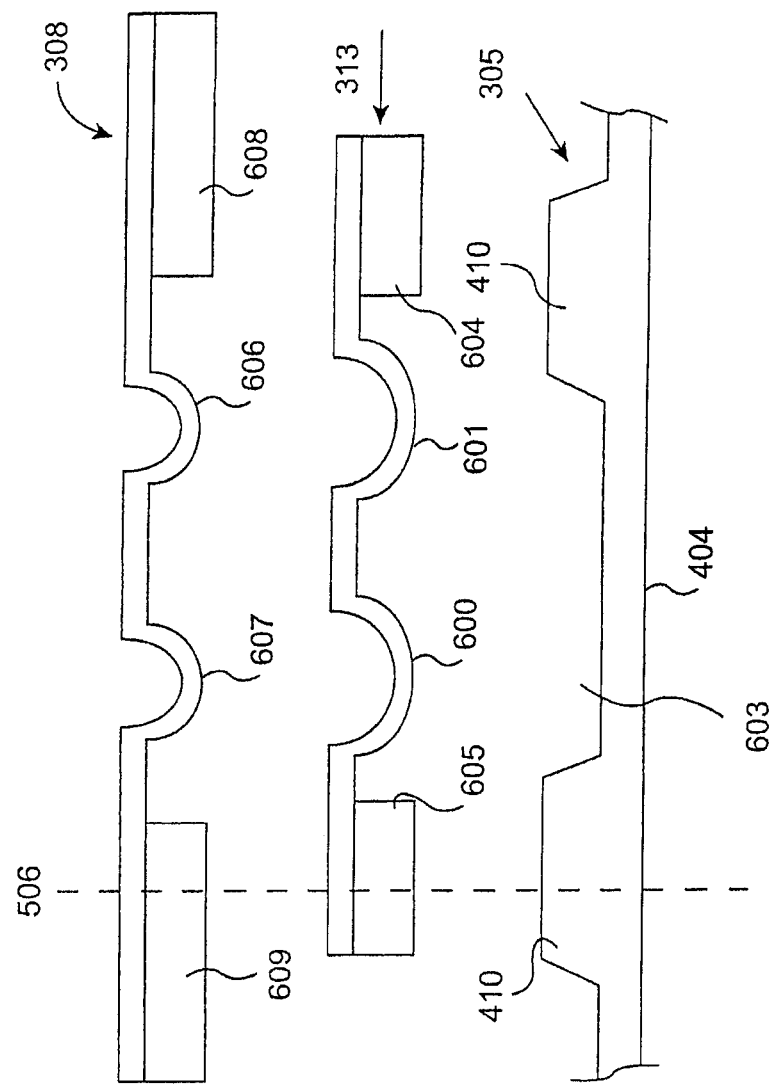
FIG. 6 is a side view illustrating the manner in which the individual reinforcement members are fastened to each other and to the B-surface of the individual panels of the gore assembly of the instant invention.
Figure 7A:
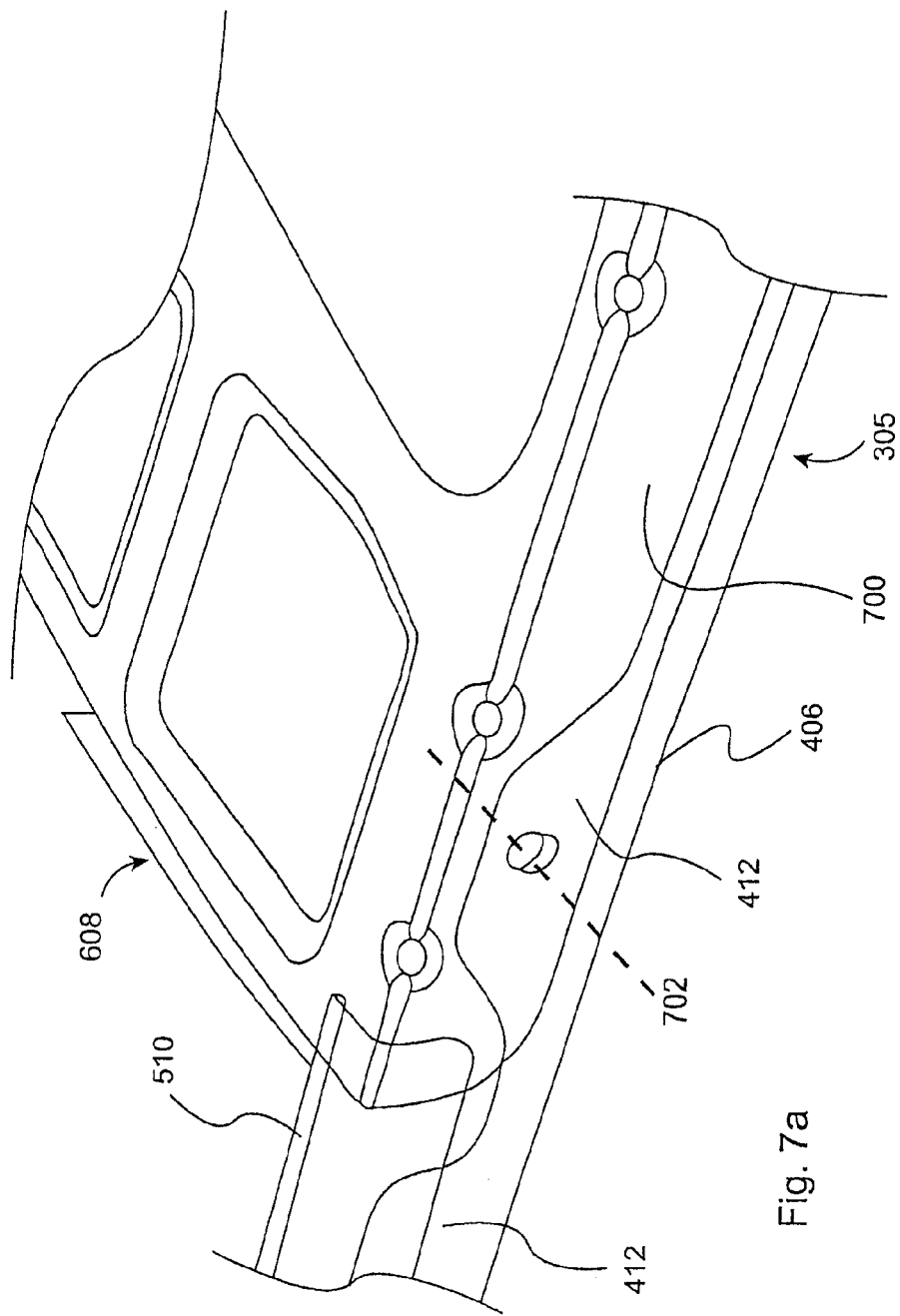
FIG. 7a is a perspective view illustrating the manner in which the individual reinforcement members are fastened to each other and to the B-surface along one of the outer radial edges of the individual panels of the gore assembly of the instant invention.
Figure 7B:
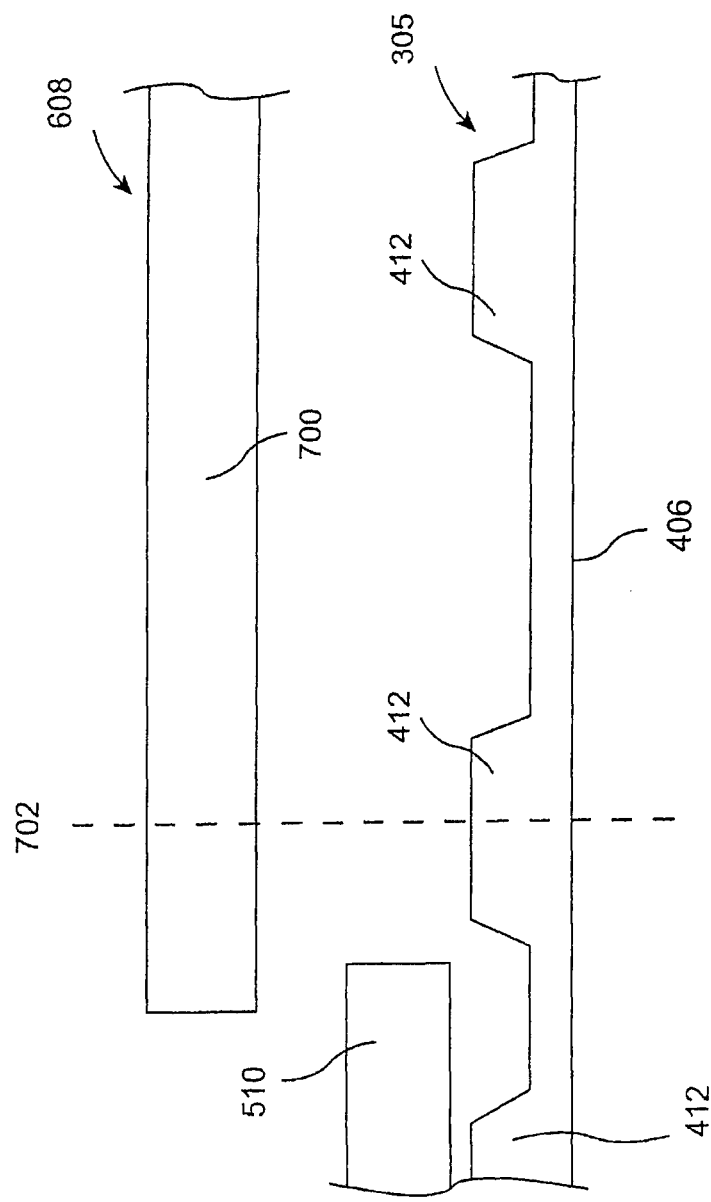
FIG. 7b is a side view illustrating the manner in which the individual reinforcement members are fastened to each other and to the B-surface along one of the outer radial edges of the individual panels of the gore assembly of the instant invention.

FIGS. 6 and 7b are exploded side views showing how the individual reinforcement members are fastened to each other and to the reinforcement surface of the individual panels utilized in the gore assembly of the instant invention. In particular, FIG. 6 shows a portion of the gore assembly along a pair of abutted radial edges, such as for instance radial edge 404 along one side of panel 305 and radial edge 406 along an adjacent side of panel 304. FIG. 7b shows a portion of the gore assembly along an outer one of the radial edges, such as for instance radial edge 406 along one side of panel 305. FIG. 7a is a perspective view showing how the individual reinforcement members are fastened to each other and to the reinforcement surface of the individual panels utilized in the gore assembly of the instant invention.

Referring to FIG. 6, the flange 412 along radial edge 406 of panel 304 is aligned with and disposed behind the flange 410 along radial edge 404 of panel 305, and so it is not visible in FIG. 6. Local attachment bracket 313 includes beads 600 and 601, which nest within notch features 603 between two raised portions of flange 410 of panel 305 and between two raised portions of the not illustrated flange 412 of panel 304. Flanges 604 and 605 of the local attachment bracket 313 are aligned with the two raised portions of the flange 410 along the radial edge 410 of the panel 305, and with the two raised portions of the not illustrated flange 412 along radial edge 406 of panel 304. Similarly, the panel reinforcement member 308 includes beads 606 and 607, which nest within the beads 600 and 601 of the local attachment bracket 313. Flanges 608 and 609 of the panel reinforcement member 308 are aligned with flanges 604 and 605, respectively, of the local attachment bracket 313, with the two raised portions of the flange 410 along the radial edge 404 of the panel 305, and with the two raised portions of the not illustrated flange 412 along radial edge 406 of panel 304. The dotted line 506 corresponds to the point in FIG. 5 where the flanges along the radial edges of the panels 304 and 305 meet with the panel reinforcement member 308 and the local attachment bracket 313.

Referring now to FIG. 7b, C-channel bracket 510 slips over a portion of the flange 412 along radial edge 406 of panel 305. Flange 700 along one edge of panel-reinforcement member 608 fits over the C-channel bracket 510 and the raised portions of flange 412. The flange 700 of the panel-reinforcement member 608 is mechanically coupled to the flange 412 of panel 305, such as by spot-welding. The overlapping flange 700 and C-channel bracket 510 provide a smooth handling surface along the outside edge 406 of the gore assembly. The dotted line 702 corresponds to a point where the flange 700 of the panel-reinforcement member 608 is mechanically coupled to the flange 412 of panel 305.

FIGS. 8a-c show selected stages during the manufacture of a gore assembly according to an embodiment of the instant invention. As is illustrated in FIG. 8a, four individual panels 302-305 are aligned in an edge-to-edge fashion, such that the flanges along the radial edge of one panel mate with the flanges along an abutted radial edge of a next panel. The panels 302-305 are mechanically coupled together, such as for instance by spot welding along the mated flanges, so to form the illustrated edge-to-edge assembly of panels identified as Part "1." In the illustrated embodiment, Part "1" is made using four common parts, panels 302-305. Optionally, fewer or more than four panels are used to make the Part "1." Being made up of four common parts permits communization/reduction in variants of reflective panels that are applied to the A-surface.

Referring now to FIG. 8b, the panel-reinforcement members 307-309 are identified collectively as Part "2," and the local attachment brackets 310-315 are identified collectively as Part "3." Part "3" provides the attachment hardware as well as structural support for localized areas. Since Part "3" can be located by fixture when mated to Part "2," attachment location variation is reduced. After being located by fixture, Part "3" is spot welded to part "2."

Referring now to FIG. 8c, finally the pre-assembled Parts "2" and "3" are spot welded to the B-surface of Part "1," resulting in the complete gore assembly 101a. The process is repeated for each of the remaining gore assemblies 101b-f, and the resulting gore assemblies 101a-f are assembled together to form the solar array 100. Optionally, more than or fewer than six gore assemblies are used to produce the solar array 100.

In an alternative embodiment, the Part "3" brackets are located and mechanically coupled to the B-surface of Part "1," such as for instance by spot welding. Subsequently, the Part "2" panel reinforcement members are located and mechanically coupled to the pre-assembled Parts "1" and "3," such as for instance by spot welding.

In a further alternative embodiment, the Part "3" brackets are omitted and the Part "2" panel reinforcement members are located and mechanically coupled to the Part "1" preassembled panels.

Figure 9:
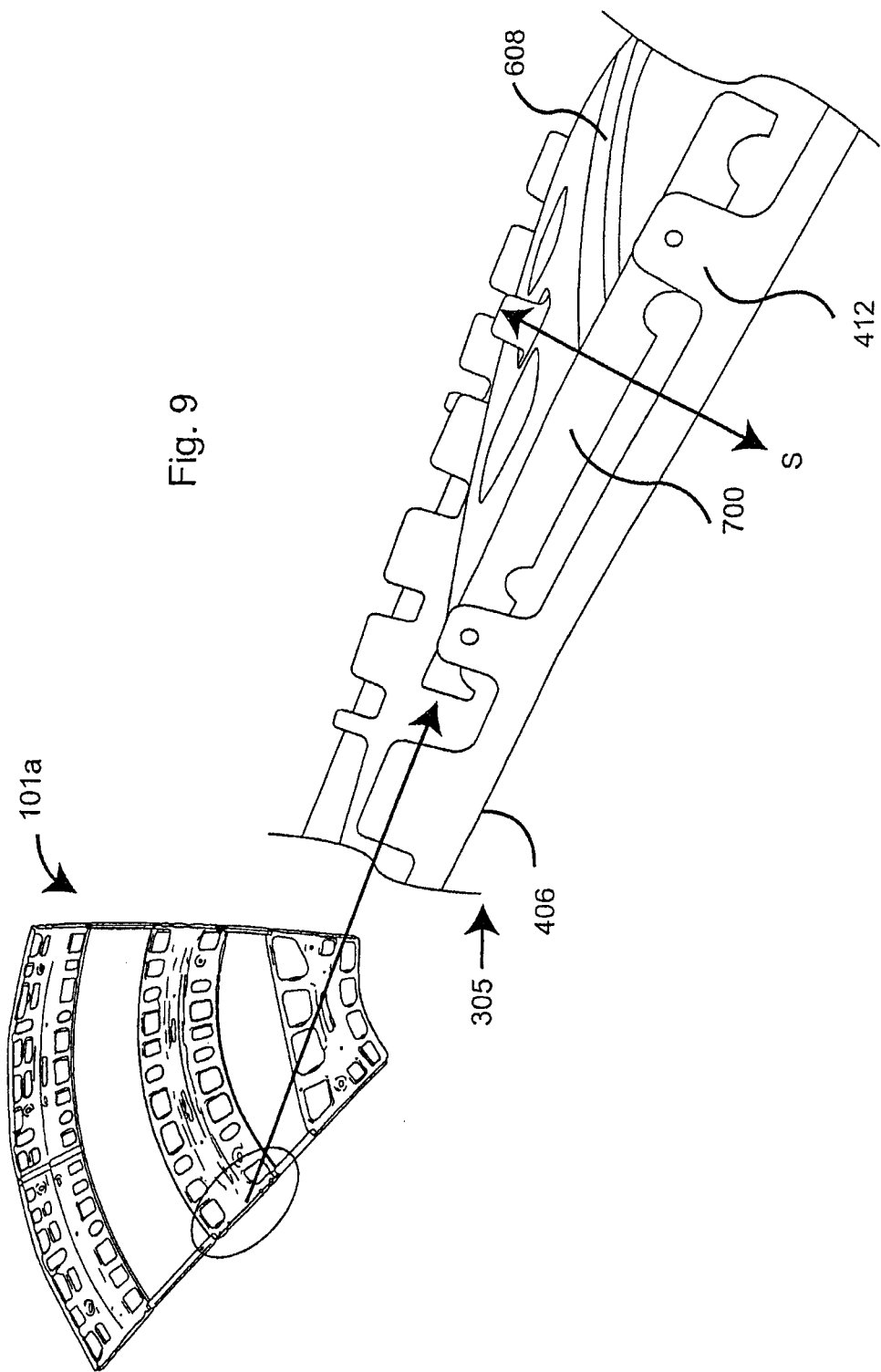
FIG. 9 shows slip planes along which the panels, reinforcement members and attachment members are movable one relative to another.

Referring now to FIG. 9, shown is the completed gore assembly 101a. The inset in FIG. 9 shows enlarged detail along the radial edge 406 of panel 305. It should be noted that the downturned side flanges of the individual panels, which are aligned with and spot-welded to Part "1," support slip-plane adjustment between Part "1" and part "2" during assembly. As is shown in the inset, slip plane adjustment along the direction "S" is supported between the optically important A-surfaces of the panels and the preassembled parts "1" and "2." There is no distortion to the A-surface of the panels because attachment to a base mounting structure is achieved using non-critical features/surfaces of Part "1" and Part "2." Overall the design slip planes between the panels and the preassembled parts "1" and "2" allows for detail part variation, but minimizes variation in the assembly for both optical performance and attachment to the structure.

Figure 10:
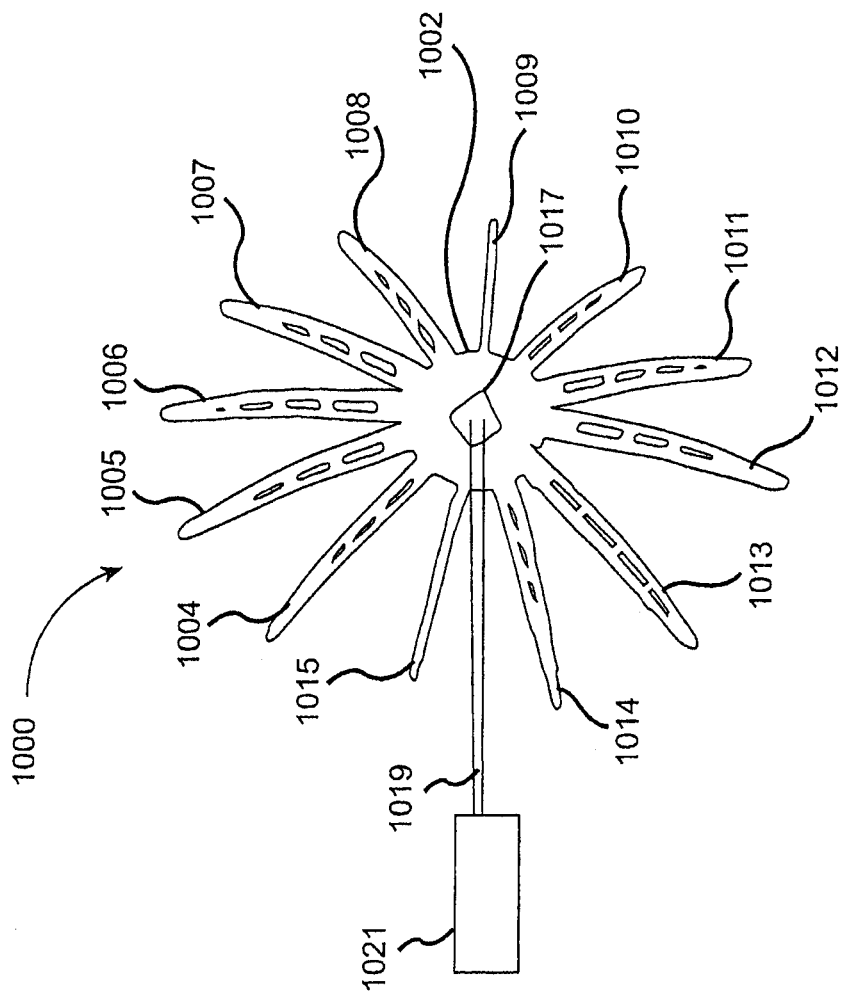
FIG. 10 shows a chassis structure onto which the solar array of FIG. 1 is mounted.

FIG. 10 shows a chassis structure 1000 for supporting solar array 100. The chassis structure 1000 includes a central hub 1002, to which a plurality of panel arms 1004-1015 is mounted. The panel arms 1004-1015 are used as a mounting frame for the gore assemblies 101a-101f. In accordance with the embodiment presented in FIGS. 1-3, each gore assembly 101a-101f is mounted to two panel arms. A mounting bracket 1017 is fastened to the central hub 1002, to which a boom arm 1019 is mounted for supporting a solar beam collector 1021 to capture the solar radiation focused thereon by the solar array 100, and to convert said solar radiation into electricity.

Turning now to FIG. 11, solar array 100 is shown mounted onto the chassis structure 1000 presented in FIG. 10. Slot 1001 provides a clearance to a mounting pole (not shown) to allow articulation of the solar array 100 between a stowing position and a sun tracking position.

The following provides a brief description for an assembly of a gore structure in accordance with an embodiment of the instant invention. Two or more individual panels are stamped from sheet metal to meet a particular optical shape. Furthermore, panel-reinforcement members and local attachment brackets are also stamped individually from sheet metal. The local attachment brackets are then spot welded to desired reinforcement locations on the panel-reinforcement members. The two or more stamped panels are then loaded into a fixture to align them with each other along their radial edges. The two or more panels are then joined to each other by spot welding along the flanges of abutted radial edges of the two or more panels. Once the two or more panels are joined together, the panel-reinforcement members are slipped onto the flanges of the panels, and then the flanges of the panel reinforcement members are spot welded to the flanges of the panels.

If desired, all components can receive a Zn-coating prior to the forming and assembly operation, so as to provide rust protection to the assembled gore structure.

In accordance with an embodiment of the instant invention, the curvature of the gore assembly, which is necessary to reflect the solar beams onto a solar beam collector, is better controlled when the gore assembly is manufactured from two or more individual panels. Furthermore, manufacturing a gore assembly using two or more individual panels provides for a more optimal material utilization of the stamped metal sheets that are used in the manufacturing of the panels. The flanges that are provided along the radial edges between the two or more panels provide better reinforcement than a one-piece panel structure, resulting in increased ability to withstand wind loading and snow loadings in addition to other general environmental loads. For example, wind speeds in excess of 90 mph can pose substantial environmental forces that a solar array must be able to withstand.

Furthermore, a gore assembly manufactured from metal parts can be produced with faster cycle times than conventional plastic sheet molded structures. A gore assembly according to an embodiment of the instant invention can also be manufactured in high volumes, has a very good thermal stability, a repeatable smooth surface and is recyclable.

It should be appreciated that the foregoing description is illustrative in nature and that the present invention includes modifications, changes, and equivalents thereof, without departure from the scope of the invention.

What is claimed is:

1. A gore assembly for focusing solar energy, comprising:
at least two panels, each panel having two radial edges and a first surface defined between said two radial edges for receiving a reflective element thereon, each panel having a second surface that is opposite the first surface and that is defined between said two radial edges, and each panel having a flange provided along at least a portion of each of said two radial edges,
wherein, in an assembled condition, one of said two radial edges of one of the at least two panels is abutted with one of said two radial edges of the other one of the at least two panels,
wherein, in the assembled condition, the flange along the one of said two radial edges of the one of the at least two panels is aligned with the flange along the one of said two radial edges of the other one of the at least two panels, the at least two panels fixedly secured one to the other via the aligned flanges along the abutted radial edges thereof, and
a panel-reinforcement member disposed adjacent to the second surfaces of the at least two panels, the panel-reinforcement member spanning the at least two panels and comprising a plurality of flanges extending away from the panel-reinforcement member and in a direction toward the second surfaces of the at least two panels, the plurality of flanges arranged for being aligned with the flanges along the radial edges of the at least two panels.

2. The gore assembly according to claim 1, wherein the flanges of the panel-reinforcement members are mechanically coupled to the flanges along the radial edges of the at least two panels.

3. The gore assembly according to claim 1, wherein the flanges of the panel-reinforcement members are mechanically coupled to the flanges along the radial edges of the at least two panels by one of an adhesive, spot welding, riveting and metal and gas welding.

4. The gore assembly according to claim 1, wherein each one of the at least two panels comprises a circumferential edge joining the two radial edges, there being a flange provided along the circumferential edge, and wherein said flange provided along the circumferential edge of each one of the at least two panels is fastened to flanges of the panel-reinforcement member.

5. The gore assembly according to claim 4, wherein, for each panel of the at least two panels, the two radial edges diverge one from the other between a first end of the panel and a second end of the panel that is opposite the first end, and wherein the circumferential edge joins the two radial edges at the second end of the panel.

6. The gore assembly according to claim 1, comprising a plurality of attachment brackets provided on predetermined locations of the panel-reinforcement member.

7. The gore assembly according to claim 6, comprising slip planes between the at least two panels, the panel reinforcement member and the plurality of attachment brackets for allowing detail part variation and minimizing a variation in an assembly of the gore assembly.

8. The gore assembly according to claim 6, wherein the plurality of attachment brackets comprises a fastening structure for fastening the gore assembly to a chassis.

9. The gore assembly according to claim 6, wherein the plurality of attachment brackets are made from metal.

10. The gore assembly according to claim 1, comprising slip planes between the at least two panels and the panel reinforcement member for allowing detail part variation and minimizing a variation in an assembly of the gore assembly.

11. The gore assembly according to claim 1, comprising at least one C-shaped bracket disposed along an outer, non-abutted radial edge of each one of the at least two panels.

12. The gore assembly according to claim 1, wherein, in the assembled condition, the first surface of each one of the at least two panels is oriented facing in substantially a same direction.

13. The gore assembly according to claim 1, wherein the first surface faces in a first direction and the second surface faces in a second direction that is substantially opposite the first direction, and wherein said flanges along the radial edges of each of said at least two panels extend along the direction away from the second surface.

14. The gore assembly according to claim 12, wherein said flanges along the radial edges of each of said at least two panels are substantially normal to the second surface of a respective one of the at least two panels.

15. The gore assembly according to claim 1, wherein the at least two panels are made from metal.

16. The gore assembly according to claim 15, wherein the metal is one of steel, aluminum and an alloy thereof.

17. The gore assembly according to claim 1, wherein the plurality of panel reinforcement members are made from metal.

18. The gore assembly according to claim 17, wherein the metal is steel.

19. A method of making a gore assembly, comprising:
stamping sheet metal so as to form at least two panels, each of the at least two panels having a first surface on a first side thereof for receiving a plurality of reflective members thereon, and having a second surface on a second side thereof that is opposite the first side, each of said at least two panels comprising opposing radial edges, each opposing radial edge having a flange defined along at least a portion thereof;
stamping sheet metal for forming a panel-reinforcement member;
aligning the flange along one radial edge of one of the at least two panels with the flange along one radial edge of the other of the at least two panels;
fastening the at least two panels one to the other along the aligned flanges of the radial edges; and
fastening the panel-reinforcement member to the second surfaces of the at least two panels, such that the panel-reinforcement member spans the at least two panels, for providing reinforcement to the gore assembly.

20. The method according to claim 19, comprising prior to fastening the panel-reinforcement member to the second surfaces of the at least two panels:
stamping sheet metal for forming a plurality of attachment brackets; and,
fastening the plurality of attachment brackets to the panel-reinforcement member.

21. The method according to claim 19, wherein the panel-reinforcement member is mated with the flanges along the radial edges of the at least two panels.

22. The method according to claim 19, wherein the panel-reinforcement member is spot-welded to the flanges along the radial edges of the at least two panels.

23. The method according to claim 19, wherein the sheet metal is coated with zinc for providing protection against rust.

24. A gore assembly for focusing solar energy, comprising:
N panels, wherein N is greater than one, each panel having two radial edges and having a first surface defined between said two radial edges, the first surface for receiving a plurality of reflective elements thereon, each panel having a second surface on a side thereof that is opposite the first surface, and each panel having a flange defined along at least a portion of each of said two radial edges, the N panels disposed in an edge-to-edge arrangement such that N−1 pairs of abutted radial edges are defined, and such that the flange along one radial edge of each pair of abutted radial edges is aligned with the flange along the other radial edge of the pair of abutted radial edges;
a panel-reinforcement member disposed in a mating relationship with the second surfaces of the N panels, the panel-reinforcement member spanning the N panels and comprising a plurality of flanges extending away from the panel-reinforcement member and in a direction toward the second surfaces of the N panels, the plurality of flanges arranged for being aligned with the flanges of the N panels; and
wherein, in an assembled condition, some flanges of the panel-reinforcement member are aligned with and mechanically coupled to the aligned flanges along the pairs of abutted radial edges of the N panels, and other flanges of the panel-reinforcement member are aligned with and mechanically coupled to the flanges along outer, non-abutted radial edges of the edge-to-edge arrangement of N panels.

25. The gore assembly according to claim 24, wherein the flanges of the panel-reinforcement member are mechanically coupled to the flanges of the edge-to-edge arrangement of N panels by one of an adhesive, spot welding, riveting and metal inert gas welding.

26. The gore assembly according to claim 24, wherein the panel reinforcement member comprise a plurality of panel reinforcement members.

27. The gore assembly according to claim 26, wherein the panel reinforcement members of the plurality of panel reinforcement members are spaced apart one from the other in a direction along the length of the radial edges of the N panels.

28. The gore assembly according to claim 26, wherein each one of the N panels comprises a circumferential edge joining the two radial edges, there being a flange provided along at least a portion of the circumferential edge, and wherein said flange provided along the at least a portion of the circumferential edge of each one of the N panels is mechanically coupled to flanges of one of the plurality of panel-reinforcement members that is disposed adjacent the circumferential edge of the N panels.

29. The gore assembly according to claim 28, wherein, for each panel of the N panels, the two radial edges diverge one from the other between a first end of the panel and a second end of the panel that is opposite the first end, and wherein the circumferential edge joins the two radial edges at the second end of the panel.

30. The gore assembly according to claim 24, comprising a plurality of attachment brackets provided on predetermined locations of the panel-reinforcement member.

31. The gore assembly according to claim 30, wherein, prior to being assembled, the N panels, the panel-reinforcement member and the plurality of attachment brackets are moveable one relative to the other within a plane, for allowing detail part variation and minimizing a variation in an assembly of the gore assembly.

32. The gore assembly according to claim 30, wherein the plurality of attachment brackets comprises a fastening structure for fastening the gore assembly to a chassis.

33. The gore assembly according to claim 30, wherein the plurality of attachment brackets is made from metal.

34. The gore assembly according to claim 24, comprising at least one C-shaped bracket disposed along each outer, non-abutted radial edge of the edge-to-edge arrangement of N panels.

35. The gore assembly according to claim 24, wherein, in the assembled condition, the first surface of each one of the N panels are oriented facing in substantially a same direction.

36. The gore assembly according to claim 24, wherein said flanges along the radial edges of each of said N panels extend in a direction that is away from and substantially normal to the second surface of a respective one of the N panels.

37. The gore assembly according to claim 24, wherein the N panels are made from metal.

38. The gore assembly according to claim 37, wherein the metal is one of steel, aluminum and an alloy thereof.

39. The gore assembly according to claim 24, wherein the plurality of panel reinforcement members are made from metal.

40. The gore assembly according to claim 39, wherein the metal is steel.

\* \* \* \* \*